(12) United States Patent
Meador

(10) Patent No.: US 11,790,683 B2
(45) Date of Patent: *Oct. 17, 2023

(54) GESTURE BASED AUTHENTICATION FOR AUTONOMOUS VEHICLES

(71) Applicant: GM Cruise Holdings LLC, San Francisco, CA (US)

(72) Inventor: Timothy Jon Meador, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/481,729

(22) Filed: Sep. 22, 2021

(65) Prior Publication Data

US 2022/0012480 A1   Jan. 13, 2022

Related U.S. Application Data

(63) Continuation of application No. 16/745,939, filed on Jan. 17, 2020, now Pat. No. 11,157,729.

(51) Int. Cl.
*G06V 40/10* (2022.01)
*G06T 7/20* (2017.01)
*G06V 40/20* (2022.01)

(52) U.S. Cl.
CPC .......... *G06V 40/11* (2022.01); *G06T 7/20* (2013.01); *G06V 40/20* (2022.01)

(58) Field of Classification Search
CPC .......... G06K 9/00845; G06K 9/00335; G06K 9/00838; G06K 2209/01; G06K 9/00362; G06K 9/00382; G06T 7/70; G06T 7/20; G06T 7/80; G06T 7/75

See application file for complete search history.

(56) References Cited

U.S. PATENT DOCUMENTS

| | | | |
|---|---|---|---|
| 2017/0030127 A1* | 2/2017 | Elie | E05F 15/74 |
| 2018/0189473 A1* | 7/2018 | Solomon | G06F 3/017 |
| 2018/0251219 A1* | 9/2018 | Taylor | G06F 3/0304 |
| 2019/0176820 A1* | 6/2019 | Pindeus | B60W 30/09 |
| 2020/0026421 A1* | 1/2020 | Rosa | G06F 3/04883 |
| 2021/0110794 A1* | 4/2021 | Borrozino | G09G 5/14 |

FOREIGN PATENT DOCUMENTS

| | | | | |
|---|---|---|---|---|
| CN | 112740226 A | * | 4/2021 | B64C 39/024 |
| WO | WO-2021203368 A1 | * | 10/2021 | G06N 3/08 |

* cited by examiner

*Primary Examiner* — Nizar N Sivji
(74) *Attorney, Agent, or Firm* — Akona IP

(57) ABSTRACT

A gesture based authentication system for an autonomous vehicle (AV) uses light detecting and ranging (lidar) to observe a user making a specific gesture and, in response to observing the gesture, authorizes the user to access the vehicle. The authentication system may first identify a human in the vicinity of the AV, and then compare a body position of the identified human to a model trained to determine if a human is performing the specific gesture. If the model determines that the identified human is performing the gesture, the AV authorizes the user to access the vehicle, e.g., to accept a delivery or to ride in the AV.

20 Claims, 4 Drawing Sheets

US 11,790,683 B2

GESTURE BASED AUTHENTICATION FOR AUTONOMOUS VEHICLES

CROSS REFERENCE TO RELATED APPLICATION

This application is a continuation of U.S. application Ser. No. 16/745,939, filed Jan. 17, 2020, which is incorporated by reference its entirety.

TECHNICAL FIELD OF THE DISCLOSURE

The present disclosure relates generally to autonomous vehicles (AVs) and, more specifically, to devices and methods for authorizing users of such vehicles based on gestures performed by the users.

BACKGROUND

Conventional delivery systems rely on delivery drivers to ensure that a delivery is delivered to a correct person. For example, a delivery driver is provided a person's name and address, and the delivery driver walks an item for delivery up to the user's door. Similarly, ridesharing systems rely on drivers to ensure that they are picking up the rider who requested the ride. For example, a driver is provided the requesting rider's name and photograph, and the driver confirms that a person entering the car is the requesting rider. In autonomous vehicle contexts, human drivers are not available to authorize delivery recipients or rideshare users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
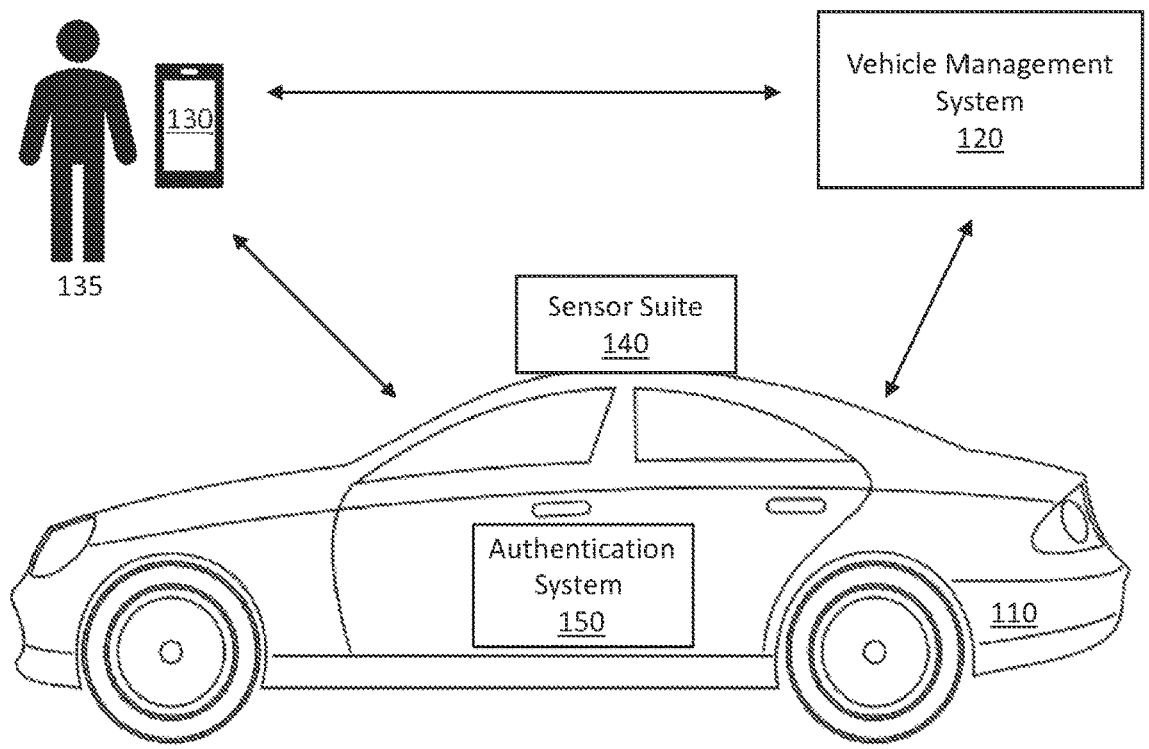
FIG. 1 is a block diagram illustrating a system including an example AV in which gesture based authentication according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Vehicle-based services, such as ridesharing and delivery services, often rely on human drivers to ensure that a service is provided to the user who requested the service. For example, a delivery app may provide the address for the delivery to the driver, who brings goods for delivery to that address. In other examples, a ridesharing app provides a location of a requesting user and information that allows the driver to identify the requesting user, e.g., the user's name and the user's picture. In autonomous vehicle (AV) contexts, a driver is not present, so a driver cannot confirm the identity of the user entering the vehicle or hand-deliver items to a requesting user.

In AV contexts, a user may follow prompts on a mobile device to obtain access to the AV. However, this may be slow or inconvenient for a user, for example, if the user has difficulty using a mobile phone, or if the user does not want to or did not remember to bring the mobile device to the AV for authentication. Alternatively, an AV may use facial recognition to identify a user. However, using detailed images of a users' faces for authentication infringes users' privacy, and in some jurisdictions may not be legal. In addition, both mobile device authentication and facial recognition authentication require the requesting user to be present, rather than allowing a trusted friend or family member to access the AV on the requesting user's behalf. Facial recognition also requires the AV to access data describing the user's face.

A gesture based authentication system enables an AV to authenticate a user of an AV-based service, such as a delivery transported by an AV to the user or an AV that transports the user, when the user performs a gesture within a field of view of the AV. The user is prompted to make a specific gesture or series of gestures in the vicinity of the AV, and one or more sensors on the AV observe the user making the gesture. In response to observing the gesture, the authentication system authenticates the user and authorizes the user to access the AV, e.g., to enter the AV for a ride, or receive a delivery from the AV. Gesture based authentication may be faster and more convenient than alternate methods, such as mobile device authentication and facial recognition authentication. Gesture based authentication does not require the user to have or to use a mobile while the user is accessing the AV. A user can instruct a second person to perform the gesture to access the AV, e.g., so the second person can take a ride arranged by the user, or so the second person can accept a delivery on the user's behalf. Furthermore, unlike using facial recognition, the gesture based authentication system preserves users' privacy by relying on gross gestures rather than using detailed camera images of the user's face.

Embodiments of the present disclosure provide a method of authenticating a user of an AV. The AV receives sensor data describing an environment surrounding the AV, the sensor data comprising data from at least one lidar (light detecting and ranging) sensor. The AV identifies, based on the sensor data, a user in the environment of the AV. The AV compares data describing at least one body position of the identified user to a model of a human performing a gesture. The model is trained based on sensor observations of a plurality of humans performing the gesture. The AV determines, based on the comparison, that the identified user is performing the gesture. In response to determining that the identified user is performing the gesture, the AV authorizes the identified user to access the AV.

Embodiments of the present disclosure also provide system for authenticating a user of an AV that includes a lidar sensor and a processor. The lidar sensor is configured to collect data describing an environment surrounding the AV. The processor is configured to identify, based on the collected data, a user in the environment of the AV; select a portion of the collected data, the selected portion describing at least one body position of the identified user; compare the selected portion of the collected data describing at least one body position of the identified user to a model of a human performing a gesture, the model trained based on sensor observations of a plurality of humans performing the gesture; determine, based on the comparison, that the identified user is performing the gesture; and in response to determining that the identified user is performing the gesture, authorize the identified user to access the AV.

Further embodiments of the present disclosure provide a system for authenticating a user of an AV that includes a sensor suite and a processor. The sensor suite is configured to collect data describing an environment surrounding the AV, and the sensor suite includes a lidar sensor, a camera, and a radar sensor. The processor is configured to identify, based on the collected data, a user in the environment of the AV; compare data describing at least one body position of the identified user to a model of a human performing a gesture, the model trained based on sensor observations of a plurality of humans performing the gesture; determine, based on the comparison, that the identified user is performing the gesture; and in response to determining that the identified user is performing the gesture, authorize the identified user to access the AV.

As will be appreciated by one skilled in the art, aspects of the present disclosure, in particular aspects of gesture based authentication for autonomous vehicles, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV Configured for Gesture Based Authentication

FIG. 1 is a block diagram illustrating a system 100 including an example AV in which gesture based authentication according to some embodiments of the present disclosure may be implemented. The system 100 includes an autonomous vehicle (AV) 110, a vehicle management system 120, and a user device 130. The AV 110 includes a sensor suite 140 and an authentication system 150. The system 100 enables the AV 110 to recognize a gesture performed by a user, e.g., a user 135 of the user device 130, and authorize the user 135 to access the AV 110. The vehicle management system 120 may prompt the user 135 to perform a specific gesture, e.g., through an interface of the user device 130.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around the AV 110. The sensor suite 140 is described further in relation to FIG. 2.

An onboard computer (not shown in FIG. 1) is connected to the sensor suite 140 and functions to control the AV 110 and to process sensed data from the sensor suite 140 and/or other sensors in order to determine the state of the AV 110. Based upon the vehicle state and programmed instructions, the onboard computer modifies or controls behavior of the AV 110. The onboard computer is preferably a general-purpose computer adapted for I/O communication with vehicle control systems and sensor suite 140, but may additionally or alternatively be any suitable computing device. The onboard computer is preferably connected to the Internet via a wireless connection (e.g., via a cellular data connection). Additionally or alternatively, the onboard computer may be coupled to any number of wireless or wired communication systems.

The authentication system 150 authenticates a user, e.g., user 135, based on a gesture performed by the user. For example, the authentication system 150 receives data collected by the sensor suite 140 describing the body position of the user 135 when the user 135 is near the AV 110, and compares the data to a model to determine if the user 135 is making a specific gesture, e.g., a gesture that the user had been prompted to make by the vehicle management system 120. If the authentication system 150 determines that the user 135 is making the gesture, the authentication system 150 permits the user 135 to access the AV 110, e.g., by unlocking a door to the AV 110. The authentication system 150 is described further in relation to FIG. 3.

The user device 130 may be a mobile device, tablet, computer, or other device for interfacing with the user 135. The user device 130 may provide one or more applications (e.g., mobile device apps, browser-based apps) with which a user can interface with a service that provides or uses AVs. For example, the service provides rides to users in AVs, or the service provides deliveries of items, prepared foods, groceries, etc. to users using AVs. The service, and particularly the AVs associated with the service, is managed by the vehicle management system 120. The vehicle management system 120 may provide the application to the user device 130. In particular, the vehicle management system 120 may provide a user interface with which the user 135 may select a particular gesture that the user 135 can make to authenticate the user to the AV 110. Alternatively, the user interface may prompt the user 135 with a specific gesture, e.g., with written instructions or an animation of the gesture to perform.

The vehicle management system 120 may select an AV from a fleet of AVs, and instruct the selected AV (e.g., AV 110) to drive to a location of the user 135 (e.g., the location of the user device 130, or an address associated with the user 135). The vehicle management system 120 instructs the authentication system 150 of the AV 110 on which gesture the user 135 uses for authentication. For example, the vehicle management system 120 may receive a selection of a gesture from the user device 130, or the vehicle management system 120 may select a gesture from a set of possible gestures. The vehicle management system 120 is described further in relation to FIG. 4.

As shown in FIG. 1, the user device 130 communicates with the vehicle management system 120. The user device 130 and vehicle management system 120 may connect over a public network, such as the Internet. The vehicle management system 120 also connects to the AV 110, e.g., over the Internet. In some embodiments, the user device 130 can communicate with the AV 110, e.g., over the Internet or a local connection, such as Bluetooth.

Example Authentication System

Figure 2:
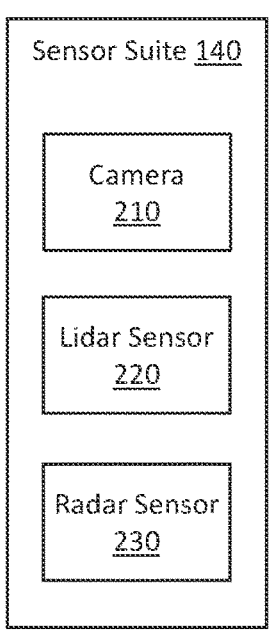
FIG. 2 is a block diagram illustrating a sensor suite according to some embodiments of the present disclosure.

FIG. 2 is a block diagram illustrating a sensor suite 140 according to some embodiments of the present disclosure. The sensor suite 140 includes multiple types of sensors, each of which has different attributes and advantages. Combining data from many multiple sensors and different sensor types allows the AV 110 to obtain a more complete view of its environment and allows the AV 110 to learn about its environment in different conditions, e.g., at different travel speeds, and in different lighting conditions. For example, as shown in FIG. 2, the sensor suite 140 includes a camera 210, lidar sensor 220, and radar sensor 230. Different and/or additional components may be included in the sensor suite 140. For example, the sensor suite 140 may also include photodetectors, sonar, GPS, wheel speed sensors, IMUs, accelerometers, microphones, strain gauges, pressure monitors, barometers, thermometers, altimeters, etc., as described with respect to FIG. 1. Further, while one camera 210, one lidar sensor 220, and one radar sensor 230 are shown in FIG. 2, the sensor suite 140 may include more than one of each of these components, e.g., to capture the environment around the AV 110 from different positions and angles, and for redundancy.

The camera 210 captures images of the environment around the AV 110. The sensor suite 110 may include multiple cameras 210 to capture different views, e.g., a front-facing camera, a back-facing camera, and side-facing cameras. The cameras 210 may be implemented using high-resolution imagers with fixed mounting and field of view.

The lidar (light detecting and ranging) sensor 220 measures distances to objects in the vicinity of the AV 110 using reflected laser light. The lidar sensor 220 may be a scanning lidar that provides a point-cloud of the region scanned. The lidar sensor 220 may have a fixed field of view or a dynamically configurable field of view.

The radar sensor 230 measures ranges and speeds of objects in the vicinity of the AV 110 using reflected radio waves. The radar sensor 230 may be implemented using a scanning radar with a fixed field of view or a dynamically configurable field of view. Radar sensors 230 may include articulating radar sensors, long-range radar sensors, short-range radar sensors, or some combination thereof.

In some embodiments, other types of time-of-flight sensors, such as time-of-flight cameras, infrared depth sensors, 3D scanners, structured light scanners, or other types of ranging techniques are used in addition to or instead of lidar and/or radar.

The data collected by the camera 210, lidar sensor 220, and radar sensor 230 is used to detect one or more objects surrounding the AV 110. For example, the sensor suite 140 produces a data set that can be used by an onboard computer to detect other cars, pedestrians, trees, bicycles, objects within a road on which the AV 110 is traveling (such as construction and/or other objects that may impede movement of the vehicle), and indications surrounding the AV 110 (such as construction signs, stop indicators, and other street signs). The data set collected by the sensor suite 140 can be used to first identify people in the area of the AV 110, and then to determine whether any of the identified people are making a gesture for authenticating the vehicle.

Example Authentication System

Figure 3:
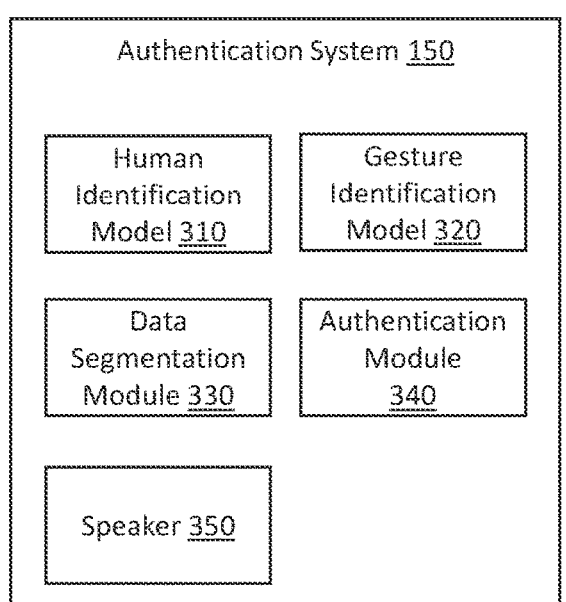
FIG. 3 is a block diagram illustrating an authentication system according to some embodiments of the present disclosure.

FIG. 3 is a block diagram illustrating the authentication system 150 according to some embodiments of the present disclosure. The authentication system 150 includes a human identification model 310, a gesture identification model 320, a data segmentation module 330, an authentication module 340, and a speaker 350. In alternative configurations, different and/or additional components may be included in the authentication system 150. Further, functionality attributed to one component of the authentication system 150 may be accomplished by a different component included in the authentication system 150 or a different system than those illustrated.

The human identification model 310 identifies humans in the environment of the AV 110. The human identification model 310 receives sensor data describing the environment surrounding the AV 110. The sensor data is collected by the sensor suite 140, described with respect to FIG. 2. The sensor data used by the human identification model 310 may include data from a subset of sensors in the sensor suite 140, e.g., data from one or more cameras 210, or data from a camera 210 and the lidar sensor 220. The human identification model 310 may be a pedestrian detection model used by the AV 110 to detect pedestrians in the vicinity of the AV 110. The human identification model 310 may be trained based on a training data set gathered by one or more AVs with similar sensor suites to the sensor suite 140. The training data may be labeled to indicate whether the training data includes pedestrians, and the locations of the pedestrians, and a machine-learned model may be trained from the training data to detect humans in sensor data gathered in real-time by the sensor suite 140. The human identification model 310 may identify multiple humans in the environment of the AV 110 and determine a number of the identified humans.

The gesture identification model 320 identifies gestures made by humans in the environment of the AV 110. The gesture identification model 320 is trained based on sensor observations of a plurality of humans performing the gesture, e.g., a training data set gathered by one or more AVs with similar sensor suites to the sensor suite 140. The training data may be labeled to indicate whether each observed human is performing a gesture, and what gesture the human is performing. To obtain the training data, a sample of test user may be provided the same gesture instructions that are provided to the users of the AV service. This way, the gesture identification model 320 is trained to recognize gestures despite variations in how users may understand and respond to the gesture instructions. The AV service may select to use gestures that the gesture identification model 320 has a high probability of identifying.

To authenticate the user 135 of the AV 110, the gesture identification model 320 receives the sensor data describing the environment surrounding the AV 110, e.g., sensor data describing the body position of one or more humans identified by the human identification model 310. The gesture identification model 320 compares the sensor data describing the body position of an identified user to the model of a human performing a gesture, e.g., a particular gesture that the user 135 has been prompted to perform. The sensor data used by the gesture identification model 320 may include data from a subset of sensors in the sensor suite 140, e.g., data from the lidar sensor 220, or data from the lidar sensor 220 and the radar sensor 230. In some embodiments, data from different sensor types are weighted differently by the gesture identification model 320 and the human identification model 310, e.g., the human identification model 310 may rely more heavily on data from the camera 210, while the gesture identification model 320 relies more heavily on data from the lidar sensor 220.

In some embodiments, the gesture identification model 320 is a binary classification model trained to determine whether a human is making a specific gesture or is not making a specific gesture. In such embodiments, the authentication system 150 may store multiple gesture identification models 320, e.g., one model for each gesture that a user may be prompted to perform (e.g., a first model for raising both arms, a second model for waving the left hand, etc.). The authentication system 150 uses the gesture identification model corresponding to the gesture that the user 135 of the AV 110 has been prompted to make. In other embodiments, the gesture identification model 320 is a multiclass classification model, e.g., a neural network, trained to determine which of a set of gestures (if any) the user 135 is performing.

In some embodiments, the user 135 is prompted to make a multi-position gesture that includes at least two positions involving at least one limb of the user 135. For example, the user 135 is prompted to first hold both arms up, then hold right arm up and left arm down, then hold left arm up and right arm down. As another example, the user 135 is prompted to perform a gesture that involves continuous movement, e.g., to perform jumping jacks, or move as though jumping rope. Using more complex gestures for authentication, and using a greater variation of gestures across the AV service, may prevent unauthorized users from accessing the AV 110, e.g., by guessing the gesture or using gesture that is known to unlock the AV 110. In embodiments where multi-position gestures are used, the sensor suite 140 collects sensor data over a period of time and describing a series of body positions of the user 135. The gesture identification model 320 may be trained to identify the full multi-position gesture in the data collected over the period of time. Alternatively, if the user 135 is prompted to perform a series of distinct gestures, the gesture identification model 320 may be trained to identify each distinct gesture, and the gesture identification model 320 or another module (e.g., the authentication module 340) determines whether the user performs the series of specified gestures in the specified order.

The data segmentation module 330 segments the sensor data and provides a portion of the sensor data to the gesture identification model 320. For example, the data segmentation module 330 receives the sensor data and data from the human identification model 310 identifying the location of any identified humans in the sensor data. The data segmentation module 330 extracts the data corresponding to the identified humans from the sensor data and provides this data, rather than the full set of data collected by the sensor suite 140, to the gesture identification model 320.

In some embodiments, the data segmentation module 330 determines the positions of the limbs of the identified human. For example, the data segmentation module 330 may include a model trained to identify limbs in the sensor data and extract limb data corresponding to the limbs from the sensor data. In this embodiment, the data segmentation module 330 provides the limb data to the gesture identification model 320, which has multiple limb models (e.g., models for arms in various positions and models for legs in various positions, or a model for each arm and each leg in various positions). The gesture identification model 320 compares the extracted limb data to one or more of the limb models to determine the positions of the user's limbs (e.g., arm raised, lowered, outstretched, or on hip; leg straight or bent). In some embodiments, the data segmentation module 330 determines the position of a subset of the limbs (e.g., the user's arms), and/or other body parts (e.g., the position of the user's head, positions of the user's hands, etc.).

The authentication module 340 determines whether or not to authenticate the user 135 based on an output from the gesture identification model 320. The authentication module 340 receives data indicating the gesture that the user 135 is expected to perform, and a signal from the gesture identification model 320 indicating the gesture that a user identified by the human identification model 310 has performed. If the authentication module 340 determines that the identified user has performed the expected gesture, the authentication module 340 authorizes the identified user (i.e., user 135) to access the AV 110. For example, the authentication module 340 unlocks one or more doors to the AV 110, or automatically opens a door or a compartment (e.g., a delivery compartment for storing food) of the AV 110. The authentication module 340 may provide an indication to the user 135 that the AV 110 has authorized the user 135 to access the AV 110, e.g., by instructing the speaker 350 to output an auditory signal (e.g., a jingle; "Hi Brandon! You may enter the AV!"), or by instructing the AV 110 to produce a visual signal (e.g., instructing the headlights, interior lights, or another light on the AV 110 to turn on or to flash).

In some embodiments, the authorization module 340 determines a particular door or compartment to unlock or open based on the signal from the gesture identification model 320 indicating which gesture the user has performed. Different gestures may be used to unlock or open different compartments or doors. For example, in a delivery context, the AV 110 has three different delivery compartments, each holding an item or items for delivery to a respective user. Each user is instructed to perform a different gesture to access their respective delivery compartment, e.g., a first user is instructed to repeatedly raise and lower a right hand to access the first delivery compartment, and a second user is instructed to repeatedly raise and lower a left hand to access the second delivery compartment. The authorization module 340 receives a signal from the gesture identification model 320 identifying the gesture performed (e.g., repeatedly raising and lowering the left hand), and, based on the identified gesture, unlocks the compartment associated with the user instructed to perform that gesture (in this example, the second delivery compartment).

In some embodiments, the authentication module 340 uses other information to determine whether or not to authorize a user to access the AV 110. In one example, the authentication module 340 receives data indicating that more than one user is expected, e.g., the user 135 has requested a ride from the AV 110 for the user 135 and for two additional people. The human identification model 310 determines a number of humans in the environment of the AV 110. The authentication module 340 compares the number of humans identified by the human identification model 310 to the number of expected users. If the numbers do not match, the authentication module 340 does not authorize the user to access the AV 110; if the numbers do match, and other criteria (including observing the user 135 making the authentication gesture) are met, the authentication module 340 authorizes the user 135 to access the AV 110.

In another example, the authentication module 340 receives data indicating physical characteristics of the user 135, e.g., height, clothing color, whether the user is accompanied by a dog. The human identification model 310 or a different model determines one or more physical characteristics of the humans identified by the human identification model 310 based on the sensor data. For example, the authentication model 340 may use one or more models trained to determine a particular physical characteristic, e.g., a model trained to estimate a person's height, or a model trained to identify a dog next to a human. The authentication module 340 compares the determined physical characteristics to the physical characteristics of the intended user of the AV 110. If the physical characteristics do not match, the authentication module 340 does not authorize the user to access the AV 110; if the physical characteristics do match, and other criteria (including observing the user 135 making the authentication gesture) are met, the authentication module 340 authorizes the user 135 to access the AV 110.

In some embodiments, the authentication module 340 prompts the user 135 to perform the gesture. For example, the authentication module 340 receives a signal from the human identification model 310 indicating that a human is within the environment of the AV 110. In response to this signal, the authentication module 340 provides an instruction to the identified user to perform the gesture. For example, the authentication module 340 may instruct the speaker 350 to output an auditory signal (e.g., a jingle or a statement, such as "Hi! Please perform your gesture to enter the vehicle!"), or the authentication module 340 may instruct one or more lights of the AV 110 to flash or turn on. After the authentication module 340 provides the prompt to the identified user to perform the gesture, the sensor suite 140 collects the data describing at least one body position of the identified user, which is provided to the gesture identification model 320. In some embodiments, the human identification model 310 determines a distance of the human to the AV 110, and provides the instruction to the user to perform the gesture if the user is within a given distance (e.g., less than 10 feet from the AV 110).

Example Vehicle Management System

Figure 4:
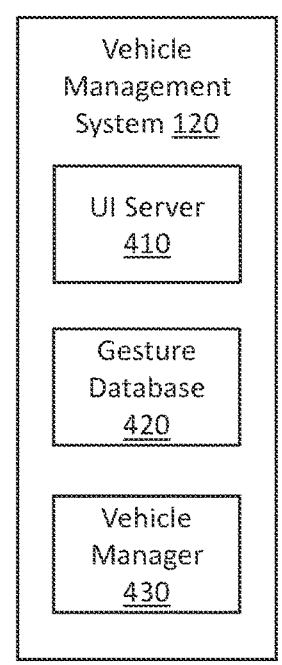
FIG. 4 is a block diagram illustrating a vehicle management system according to some embodiments of the present disclosure.

FIG. 4 is a block diagram illustrating the vehicle management system 120 according to some embodiments of the present disclosure. The vehicle management system 120 includes a UI (user interface) server 410, a gesture database 420, and a vehicle manager 430. In alternative configurations, different and/or additional components may be included in the vehicle management system 120. Further, functionality attributed to one component of the vehicle management system 120 may be accomplished by a different component included in the vehicle management system 120 or a different system than those illustrated.

The UI server 410 is configured to communicate with a client device, e.g. the user device 130, that provides a user interface to a user, e.g. the user 135. For example, the UI server 410 may be a web server that provides a browser-based application to the user device 130, or the UI server 410 may be a mobile app server that interfaces with a mobile app installed on the user device 130. The user interface enables the user to access a service of the vehicle management system, e.g., to request a ride from the AV 110, or to request a delivery from the AV 110. The UI server 410 receives data submitted by the user into the user interface. For example, in some embodiments, the UI server 410 receives a user selection of a gesture that the user 135 would like to use for authentication to the AV 110. The UI server 410 provides data to the user. For example, in some embodiments, the UI server 410 provides instructions for the user 135 to perform a gesture for authentication to the AV 110. The instructions may include written instructions (e.g., "Raise your right hand when you see your vehicle approaching"; "Do a jumping jack when you see your vehicle"), pictures, animations, or other types of instructions.

The gesture database 420 stores gesture options for gesture based authentication. In some embodiments, the gesture database 420 also stores one or more gesture identification models, e.g., the gesture identification model 320. The vehicle management system 120 (e.g., the vehicle manager 430) provides the gesture identification model 320 to AVs, e.g., AV 110, for use in the authentication system 150.

In some embodiments, the gesture options stored in the gesture database 420 may be selected by users in the user interface. In such embodiments, the user interface provides a list of gestures to the user, and the user interface receives a user selection of one of the gestures that the user uses for authentication.

In other embodiments, the gesture database stores a set of instructions for users to perform a corresponding set of gestures. The vehicle management system 120 (e.g., the UI server 410) may select a specific gesture from the set of gestures for the user 135. The gesture database 420 transmits the instructions for the selected gesture to the UI server 410, which transmits the instructions to the user device 130. In some embodiments, the instructions also include instructions for the user to stand at a particular position, or within a particular range of positions, relative to the AV 110 (e.g., in front of the AV 110, or near the right doors of the AV 110). In such embodiments, the human identification model 310 analyzes sensor data within the position or range of positions (e.g., positions to the front of the AV 110, or positions extending outward from the right doors of the AV 110) and identifies the user 135 within that range of positions. This can help the human identification model 310 identify the correct person as the user 135, e.g., if the AV 110 is in a crowded area.

The vehicle manager 430 manages and communicates with a fleet of AVs, including AV 110. The vehicle manager 430 may assign AVs to various tasks and direct the movements of the AVs in the fleet. The vehicle manager 430 provides instructions to AVs to perform authentication of users based on gestures performed by users. For example, the vehicle manager 430 selects an AV (e.g., AV 110) in a fleet of vehicles to dispatch to the user 135, e.g., based on a request for a service received at the UI server 410. The vehicle manager 430 receives a selection of a gesture for the user 135 from the UI server 410. The vehicle manager 430 transmits data identifying the selected gesture to the selected AV 110, and the selected AV 110 authenticates the user 135 in response to the user performing the selected gesture. In some embodiments, the data identifying the selected gesture includes a gesture identification model for recognizing the specific gesture. In other embodiments, the AV 110 locally stores the gesture identification model(s) used to recognize gestures.

In some situations, the vehicle manager 430 may assign multiple AVs to the same geographic area. In such situations, different gestures can be assigned to different users in the geographic area. For example, if a jumping jack gesture is used to authorize a user to a first AV dispatched to a geographic area, the vehicle manager 430 can retrieve this gesture selection and select a different gesture (e.g., jumping rope) for a second AV dispatched to the same geographic area.

Example Process for Gesture Based Authentication

Figure 5:
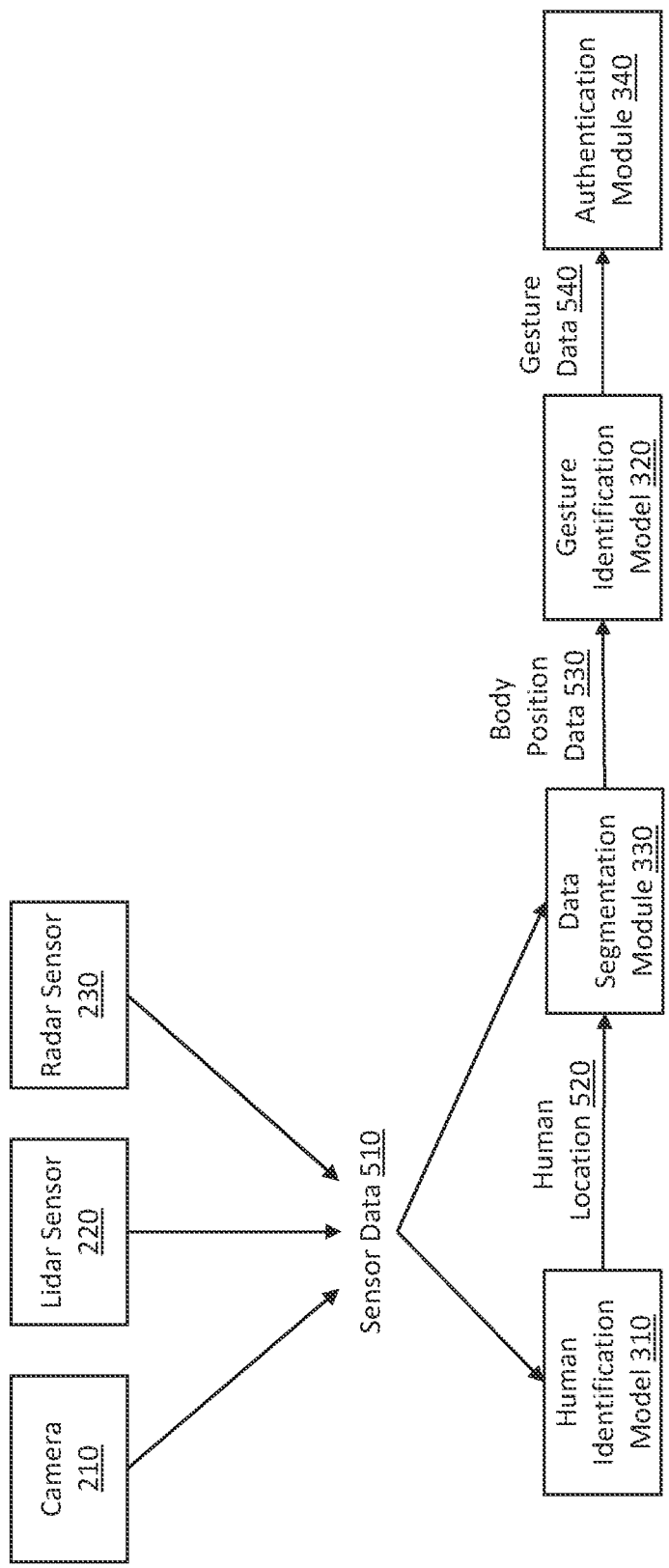
FIG. 5 is a flow diagram showing a process for authenticating a user of an AV according to some embodiments of the present disclosure.

FIG. 5 is a flow diagram showing a process for authenticating a user of an AV according to some embodiments of the present disclosure. One or more cameras 210, one or more lidar sensors 220, and one or more radar sensors 230 produce sensor data 510. The sensors 210, 220, and 230 are described above in relation to FIG. 2. The sensor data 510 is provided to the human identification model 310, described above with relation to FIG. 3. The human identification model 310 determines a human location 520, e.g., the location of the user 135 relative to the AV 110. The human identification model 310 also identifies any other users in the area of the AV 110 and determines their locations.

In this embodiment, the human location 520 is passed to the data segmentation module 330. The data segmentation module 330 also receives the sensor data 510 and extracts sensor data corresponding to the human location 520 as body position data 530. For example, the data describing a human location 520 includes a spatial range describing the location of the human in 3D space, or the location of the human relative to the AV 110. The human location may be described using angular coordinates, Cartesian coordinates, or another coordinate system. The data segmentation module 330 may extract a fixed portion of the sensor data 510 from an area surrounding the human location 520 as the body position data 530. Alternatively, the data segmentation module 330 may determine a portion of the sensor data 510 based on the portion of the field of views of the sensors 210, 220, and 230 that the human encompasses. For example, a greater amount of the sensor data 510 may describe a human closer to the AV 110 than a human farther from the AV 110 because the human closer to the AV 110 takes up a greater portion of the field of view of the sensors 210, 220, and 230. If the sensor suite 140 includes sensors with partial fields of view around the AV 110, e.g., multiple cameras 210 that point in different directions around the AV 110, the data segmentation module 330 extracts body position data 530 from sensor data captured by sensors whose field of view includes the human location 520.

The body position data 530 is passed to the gesture identification model 320, described above with relation to FIG. 3. The gesture identification model 320 compares the body position data 530 to the model of a human performing a gesture that the user 135 was prompted to perform. The gesture identification model 320 outputs gesture data 540. For example, the gesture identification model 320 is a neural network trained to determine which of a set of gestures a human is performing, the gesture data 540 may be a classification of a gesture performed by the user. Alternatively, if the gesture identification model 320 is a binary classifier trained to determine whether or not the user 135 is performing a specific gesture assigned to the user, the gesture data 540 is a binary value.

The authentication module 340 receives the gesture data 540 from the gesture identification model 320. The authentication model 340 determines whether to authorize the user 135 to access the AV 110, and if the user is authorized, instructs locks and/or doors of the AV 110 to open and allow the user 135 to access some or all of the AV 110. In addition, the authentication model 340 may instruct one or more speakers, lights, or other visual displays on the AV 110 to inform the user 135 if the user 135 has been authorized or has not been authorized.

Example Use Cases for Gesture Based Authentication

Figure 6:
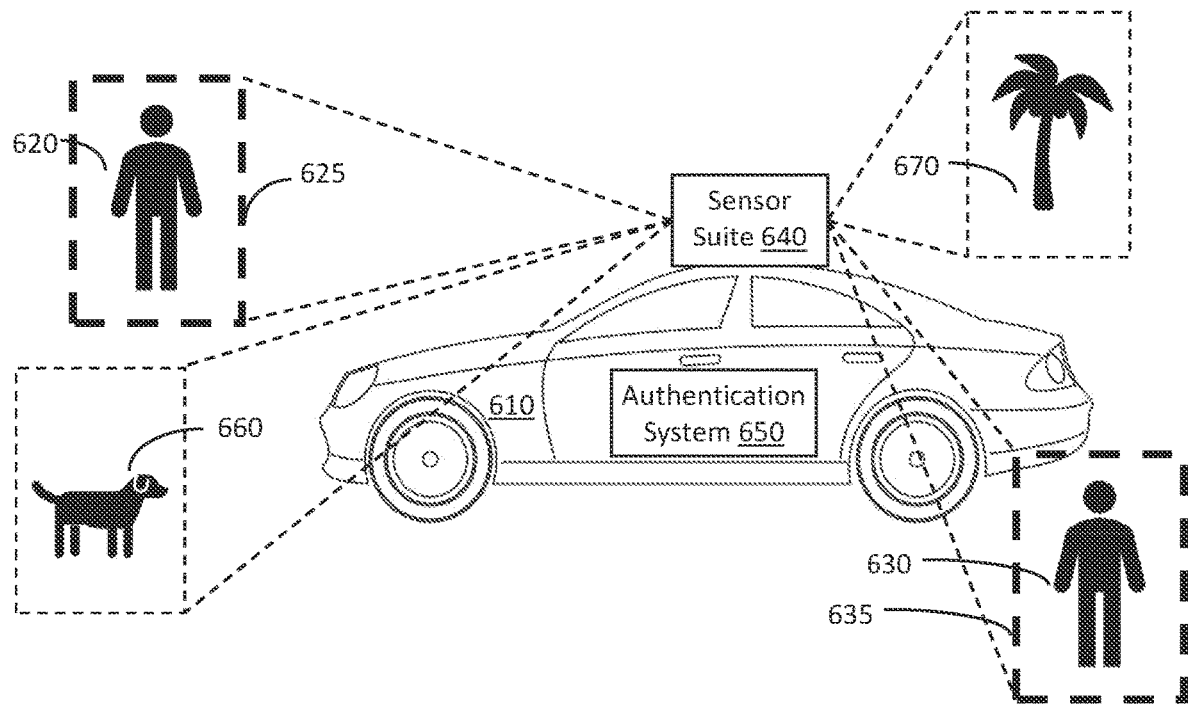
FIG. 6 illustrates an example use case of an example AV identifying humans in its environment according to some embodiments of the present disclosure.

FIG. 6 illustrates an example use case of an example AV 610 identifying humans in its environment according to some embodiments of the present disclosure. The AV 610 is similar to the AV 110, and the AV 610 has a sensor suite 640 and an authentication system 650, which are similar to the sensor suite 140 and authentication system 150, described above. The sensor suite 640 collects data about a number of objects in the vicinity of the AV 610. These include a first person 620, a second person 630, a dog 660, and a tree 670.

The authentication system 650, e.g., the human identification model 310, determines which of the objects in the vicinity of the AV 110 are humans. In this example, the human identification model 310 identifies the first person 620 and the second person 630 as humans, as indicated by the bold bounding boxes 625 and 635.

The authentication system 650, e.g., the data segmentation module 330, may extract data collected by the sensor suite 640 describing the first person 620 and second person 630. For example, the data segmentation module 330 extracts data within the bounding boxes 625 and 635 and provides this extracted data to a gesture identification model.

Figure 7:
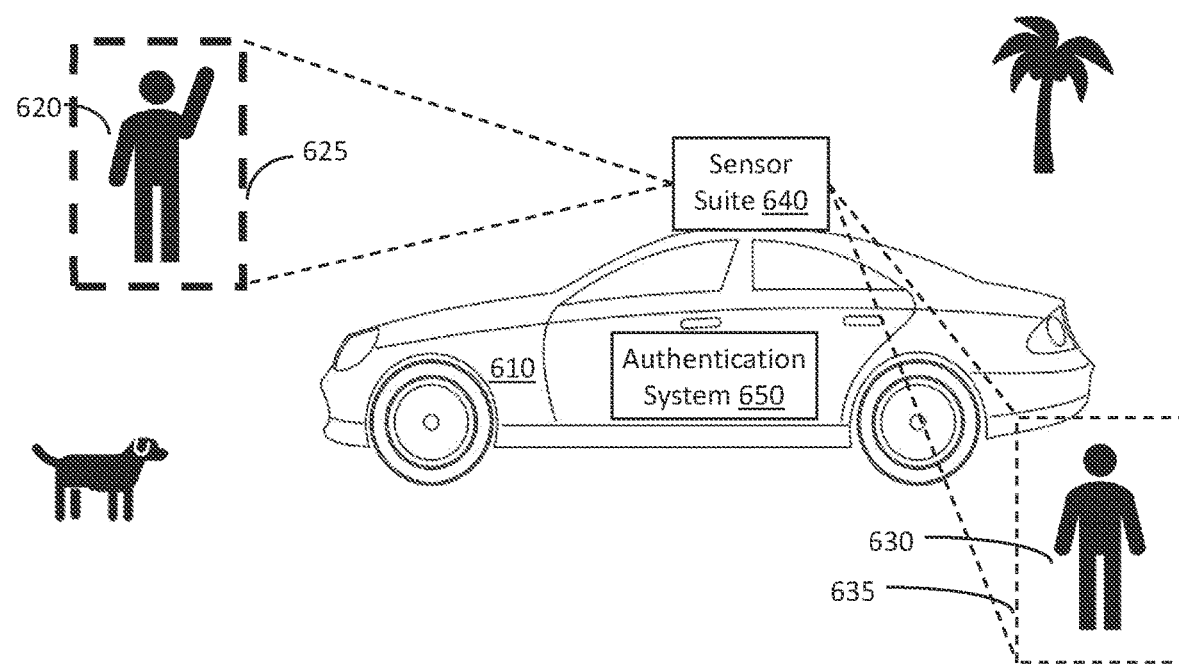
FIG. 7 illustrates an example use case of an example AV identifying an authorized user based on a gesture according to some embodiments of the present disclosure.

FIG. 7 illustrates an example use case of the example AV 610 identifying an authorized user based on a gesture according to some embodiments of the present disclosure. The authentication system 650, e.g., the gesture identification module 330, analyzes the body positions of the first person 620 and the second person 630 to determine if either is an authorized user, e.g., user 135. The gesture identification module 330 may analyze the body positions after the authentication system 650 (e.g., a speaker 350) has output a prompt to perform the gesture for authentication. In other embodiments, the gesture identification module 330 continually analyzes the body positions of the identified first person 620 and second person 630 to determine if either performs the gesture.

As shown in FIG. 7, the first person 620 is raising the left hand while holding the right hand down. This is the authentication gesture that the first person 620 has been instructed to perform, e.g., by a user interface provided on the user device 130. The gesture identification module 330 determines that the first person 620 has performed the gesture, and the authentication system 650 (e.g., the authentication module 340) allows the first person 620 to access the AV 610.

Figure 8:
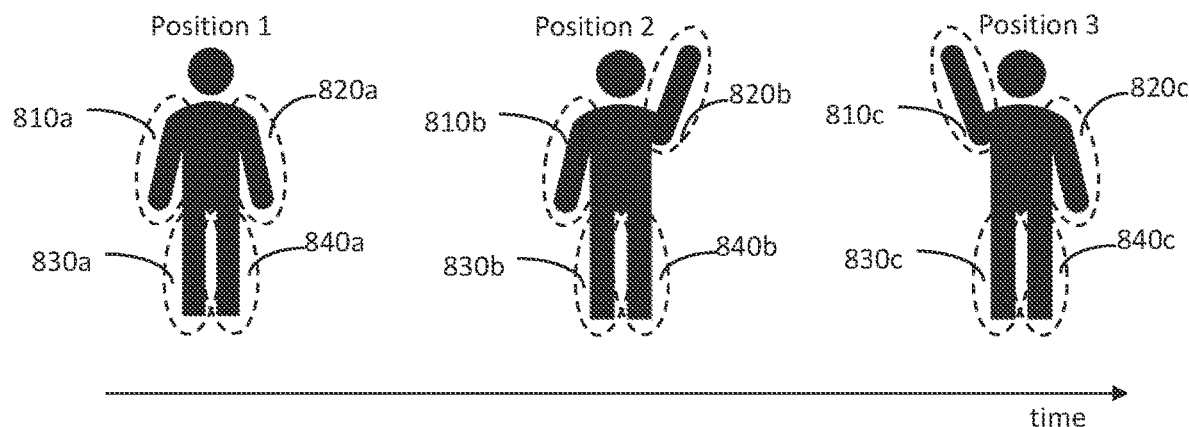
FIG. 8 illustrates an example series of gestures performed by an authorized user according to some embodiments of the present disclosure.

FIG. 8 illustrates an example series of gestures performed by an authorized user according to some embodiments of the present disclosure. The user performs the series of gestures labeled as Position 1, Position 2, and Position 3. The user first performs the gestures over a period of time, first performing Position 1, then Position 2, then Position 3. The authentication system 150 determines that the user performs the three gestures in the correct order to authenticate the user to the AV 110.

In this embodiment, the authentication system 150 receives data describing the user and identifies the limbs 810, 820, 830, and 840 of the user. For example, the segmentation module 330 identifies the two arms 810 and 820 and two legs 830 and 840, and extracts data for each limb from the sensor data received from the sensor suite 140. In this embodiment, the gesture identification module 330 may determine the position of each limb at each point in time. For example, the gesture identification module 330 determines that in Position 1, the user's left arm 820a is down by the user's side; in Position 2, the user's left arm 820b is raised; and in Position 3, the user's left arm 820c is down by the user's side again. The authentication module 340 receives data describing the positions of each limb and at each time, and uses this data to determine if the user has made the correct gesture for authentication to the AV 110.

Example Method for Gesture Based Authentication

Figure 9:
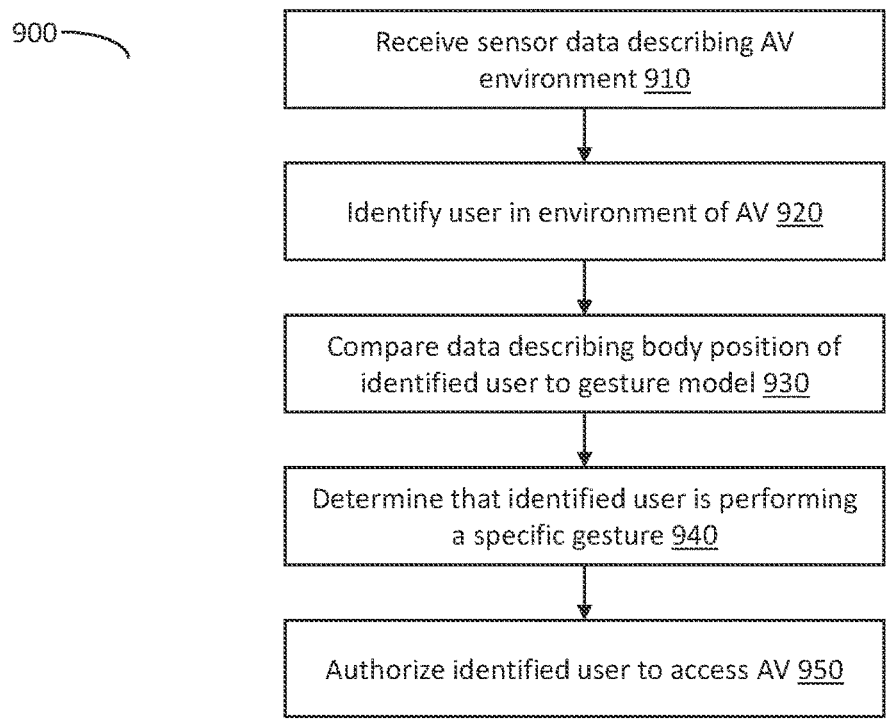
FIG. 9 is a flowchart of an example method for authenticating a user of an AV according to some embodiments of the present disclosure.

FIG. 9 is a flowchart of an example method for authenticating a user of an AV according to some embodiments of the present disclosure. An authentication system 150 receives 910 sensor data (e.g., from the sensor suite 140) describing the environment of the AV 110. The authentication system 150 (e.g., the human identification model 310) identifies 920 a user in the environment of the AV 110. The authentication system 150 (e.g., the gesture identification model 320) compares 930 data describing a body position of the identified user to a gesture model. The authentication system 150 (e.g., the authentication module 340) determines 940 that the identified user is performing a specific gesture, e.g., a gesture that the user has been prompted to perform to authenticate to the AV 110. The authentication system 150 (e.g., the authentication module 340) then authorizes 950 the identified user to access the AV 110.

Select Examples

Example 1 provides a method for authenticating a user of an autonomous vehicle (AV), the method including receiving sensor data describing an environment surrounding the AV, the sensor data including data from at least one lidar sensor; identifying, based on the sensor data, a user in the environment of the AV; comparing data describing at least one body position of the identified user to a model of a human performing a gesture, the model trained based on sensor observations of a plurality of humans performing the gesture; determining, based on the comparison, that the identified user is performing the gesture; and in response to determining that the identified user is performing the gesture, authorizing the identified user to access the AV.

Example 2 provides the method according to example 1, where the sensor data further includes data from at least one of a camera and a radar sensor.

Example 3 provides the method according to example 1 or 2, where the gesture includes at least two different positions involving at least one limb, and the data describing the at least one body position includes data collected over a period of time describing a series of body positions of the identified user.

Example 4 provides the method according to any one of the preceding examples, where the model of a human performing a gesture includes a plurality of models of limbs in a plurality of limb positions, and comparing data describing at least one body position of the identified user to a model of a human performing a gesture includes identifying a limb of the identified user in the sensor data, and comparing data describing a position of the identified limb to one of the plurality of models of limbs.

Example 5 provides the method according to any one of the preceding examples, further including transmitting, to a user device associated with the user, instructions to perform the gesture to obtain authorization to access the AV.

Example 6 provides the method according to example 5, where the instructions include instructions for the user to stand within a range of positions relative to the AV, and identifying a user in the environment of the AV includes analyzing sensor data corresponding to the range of positions relative to the AV, and identifying the user located within the range of positions relative to the AV.

Example 7 provides the method according to any one of the preceding examples, further including in response to identifying the user in the environment of the AV, providing an instruction to the identified user to perform the gesture, and after providing the instruction to the identified user to perform the gesture, collecting the data describing at least one body position of the identified user.

Example 8 provides the method according to any one of the preceding examples, further including outputting, from the AV, at least one of an auditory signal and a visual signal indicating that the AV has authorized the identified user to access the AV.

Example 9 provides the method according to any one of the preceding examples, further including identifying, based on the sensor data, a plurality of users in the environment of the AV, the plurality of users including the identified user; determining a number of the plurality of users; and authorizing the identified user to access the AV further in response to the number of the plurality of users being equal to a number of expected users.

Example 10 provides the method according to any one of the preceding examples, further including determining, based on the sensor data, at least one physical characteristic of the identified user; comparing the at least one physical characteristic of the identified user to at least one physical characteristic of an intended user of the AV; and authorizing the identified user to access the AV further in response to the at least one physical characteristic of the identified user matching the at least one physical characteristic of the intended user.

Example 11 provides a system for authenticating a user of an autonomous vehicle (AV) including a lidar sensor configured to collect data describing an environment surrounding the AV, and a processor. The processor is configured to identify, based on the collected data, a user in the environment of the AV; select a portion of the collected data, the selected portion describing at least one body position of the identified user; compare the selected portion of the collected data describing at least one body position of the identified user to a model of a human performing a gesture, the model trained based on sensor observations of a plurality of humans performing the gesture; determine, based on the comparison, that the identified user is performing the gesture; and in response to determining that the identified user is performing the gesture, authorize the identified user to access the AV.

Example 12 provides the system according to example 11, the system further including at least one of a camera configured to collect images of the environment surrounding the AV, and a radar sensor configured to collect data describing the environment surrounding the AV.

Example 13 provides the system according to example 11 or 12, where the gesture includes at least two different positions involving at least one limb, and the data describing the at least one body position includes data collected over a period of time describing a series of body positions of the user.

Example 14 provides the system according to any of examples 11 to 13, where the model of a human performing a gesture includes a plurality of models of limbs in a plurality of limb positions, and the processor is configured to compare the selected portion of the collected data describing at least one body position of the identified user to the model of a human performing a gesture by identifying a limb of the identified user in the sensor data, and comparing data describing a position of the identified limb to one of the plurality of models of limbs.

Example 15 provides the system according to any of examples 11 to 14, where the processor is further configured to analyze sensor data corresponding to a range of positions relative to the AV, the range of positions provided to the user in an instruction to perform the gesture, and identify the user located within the range of positions relative to the AV.

Example 16 provides the system according to any of examples 11 to 15, where the processor is further configured to, in response to identifying the user in the environment of the AV, provide an instruction to the user to perform the gesture; and after providing the instruction to the user to perform the gesture, collect the data describing at least one body position of the identified user.

Example 17 provides the system according to any of examples 11 to 16, where the processor is further configured to identify, based on the sensor data, a plurality of users in the environment of the AV, the plurality of users including the identified user; determine a number of the plurality of users; and authorize the identified user to access the AV further in response to the number of the plurality of users being equal to a number of expected users.

Example 18 provides the system according to any of examples 11 to 17, where the processor is further configured to determine, based on the sensor data, at least one physical characteristic of the identified user; compare the at least one physical characteristic of the identified user to at least one physical characteristic of an intended user of the AV; and authorize the identified user to access the AV further in response to the at least one physical characteristic of the identified user matching the at least one physical characteristic of the intended user.

Example 19 provides a system for authenticating a user of an autonomous vehicle (AV) including a sensor suite configured to collect data describing an environment surrounding the AV, the sensor suite including a lidar sensor, a camera, and a radar sensor; and a processor configured to identify, based on the collected data, a user in the environment of the AV; compare data describing at least one body position of the identified user to a model of a human performing a gesture, the model trained based on sensor observations of a plurality of humans performing the gesture; determine, based on the comparison, that the identified user is performing the gesture; and in response to determining that the identified user is performing the gesture, authorize the identified user to access the AV.

Example 20 provides the system according to example 19, where identifying the user in the environment of the AV includes comparing the collected data to a model of a human, the model trained based on observations by lidar sensors, cameras, and radar sensors of a plurality of humans in a plurality of environments of a plurality of AVs.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method of authenticating a user of an autonomous vehicle (AV) comprising:
    selecting an authentication gesture to associate with a user of an AV, the authentication gesture selected from a gesture database storing plurality of authentication gestures, wherein a second authentication gesture different from the authentication gesture is associated with another user;
    transmitting, to a user device associated with the user, instructions to perform the authentication gesture to obtain authorization to access the AV;
    receiving sensor data describing an environment surrounding the AV, the sensor data comprising data from at least one light detecting and ranging (lidar) sensor;
    identifying, based on the sensor data, the user in the environment of the AV;
    comparing sensor data describing at least one body position of the identified user to a model of a human performing the authentication gesture, the model trained based on sensor observations of a plurality of humans performing the authentication gesture;
    determining, based on the comparison, that the identified user is performing the authentication gesture; and
    in response to determining that the identified user is performing the authentication gesture, authorizing the identified user to access the AV.

2. The method of claim 1, wherein the sensor data further comprises data from at least one of a camera and a radar sensor.

3. The method of claim 1, wherein the instructions comprise instructions for the user to stand within a range of positions relative to the AV, and identifying the user in the environment of the AV comprises:
analyzing sensor data corresponding to the range of positions relative to the AV, and
identifying the user located within the range of positions relative to the AV.

4. The method of claim 1, wherein the model of a human performing the authentication gesture comprises a plurality of models of limbs in a plurality of limb positions, and comparing sensor data describing at least one body position of the identified user to a model of a human performing the authentication gesture comprises:
identifying a limb of the identified user in the sensor data; and
comparing data describing a position of the identified limb to one of the plurality of models of limbs.

5. The method of claim 1, further comprising outputting, from the AV, at least one of an auditory signal and a visual signal indicating that the AV has authorized the identified user to access the AV.

6. The method of claim 1, further comprising:
identifying, based on the sensor data, a plurality of users in the environment of the AV, the plurality of users including the identified user;
determining a number of the plurality of users; and
authorizing the identified user to access the AV further in response to the number of the plurality of users being equal to a number of expected users.

7. The method of claim 1, further comprising:
determining, based on the sensor data, at least one physical characteristic of the identified user;
comparing the at least one physical characteristic of the identified user to at least one physical characteristic of an intended user of the AV; and
authorizing the identified user to access the AV further in response to the at least one physical characteristic of the identified user matching the at least one physical characteristic of the intended user.

8. The method of claim 1, wherein the other user assigned the second authentication gesture is in a same geographic area as the user, and the second authentication gesture authorizes the other user to access a second AV.

9. The method of claim 1, wherein the authentication gesture is to access a first compartment of the AV, and the second authentication gesture assigned to the other user is to access a second compartment of the AV.

10. The method of claim 9, wherein the user is a first delivery user to obtain a first delivery item from the AV, and the other user is a second delivery user to obtain a second delivery item from the AV.

11. The method of claim 1, wherein the authorization to access the AV comprises authorization to access at least one interior compartment of the AV.

12. The method of claim 11, further comprising:
in response to authorizing the identified user to access the AV, unlocking at least one door of the AV.

13. A system for authenticating a user of an autonomous vehicle (AV) comprising:
a light detecting and ranging (lidar) sensor configured to collect data describing an environment surrounding the AV;
a vehicle management system to:
associate an authentication gesture with a user of the AV, the authentication gesture selected from a gesture database storing plurality of authentication gestures, wherein a second authentication gesture different from the authentication gesture is associated with another user; and
transmit, to a user device associated with the user, instructions to perform the authentication gesture to obtain authorization to access the AV; and
a processor configured to:
receive data identifying the authentication gesture associated with the user;
identify, based on the collected data, the user in the environment of the AV;
select a portion of the collected data, the selected portion describing at least one body position of the identified user;
compare the selected portion of the collected data describing at least one body position of the identified user to a model of a human performing the authentication gesture, the model trained based on sensor observations of a plurality of humans performing the authentication gesture;
determine, based on the comparison, that the identified user is performing the authentication gesture; and
in response to determining that the identified user is performing the authentication gesture, authorize the identified user to access the AV.

14. The system of claim 13, further comprising at least one of:
a camera configured to collect images of the environment surrounding the AV; and
a radar sensor configured to collect data describing the environment surrounding the AV.

15. The system of claim 13, wherein the model of a human performing the authentication gesture comprises a plurality of models of limbs in a plurality of limb positions, and the processor is configured to compare the selected portion of the collected data to the model of a human performing a gesture by:
identifying a limb of the identified user in the collected data; and
comparing data describing a position of the identified limb to one of the plurality of models of limbs.

16. The system of claim 13, wherein the processor is further configured to:
analyze sensor data corresponding to a range of positions relative to the AV, the range of positions provided to the user in an instruction to perform the authentication gesture, and
identify the user located within the range of positions relative to the AV.

17. The system of claim 13, wherein the processor is further configured to:
identify, based on the collected data, a plurality of users in the environment of the AV, the plurality of users including the identified user;
determine a number of the plurality of users; and
authorize the identified user to access the AV further in response to the number of the plurality of users being equal to a number of expected users.

18. The system of claim 13, wherein the processor is further configured to:
determine, based on the collected data, at least one physical characteristic of the identified user;
compare the at least one physical characteristic of the identified user to at least one physical characteristic of an intended user of the AV; and
authorize the identified user to access the AV further in response to the at least one physical characteristic of the identified user matching the at least one physical characteristic of the intended user.

19. A system for authenticating a user of an autonomous vehicle (AV) comprising:
- a sensor suite configured to collect data describing an environment surrounding the AV, the sensor suite comprising a light detecting and ranging (lidar) sensor, a camera, and a radar sensor;
- a vehicle management system to:
  - associate an authentication gesture with a user of the AV, the authentication gesture selected from a gesture database storing plurality of authentication gestures, wherein a second authentication gesture different from the authentication gesture is associated with another user; and
  - transmit, to a user device associated with the user, instructions to perform the authentication gesture to obtain authorization to access the AV; and
- a processor configured to:
  - receive data identifying the authentication gesture associated with the user;
  - identify, based on the collected data, the user in the environment of the AV;
  - compare sensor data describing at least one body position of the identified user to a model of a human performing the authentication gesture, the model trained based on sensor observations of a plurality of humans performing the authentication gesture;
  - determine, based on the comparison, that the identified user is performing the authentication gesture; and
  - in response to determining that the identified user is performing the authentication gesture, authorize the identified user to access the AV.

20. The system of claim 19, wherein identifying the user in the environment of the AV comprises comparing the collected data to a model of a human, the model trained based on observations by lidar sensors, cameras, and radar sensors of a plurality of humans in a plurality of environments of a plurality of AVs.

* * * * *